Jan. 4, 1927. 1,613,320
H. F. GILLOT
WEAVING LOOM
Filed Jan. 9, 1926
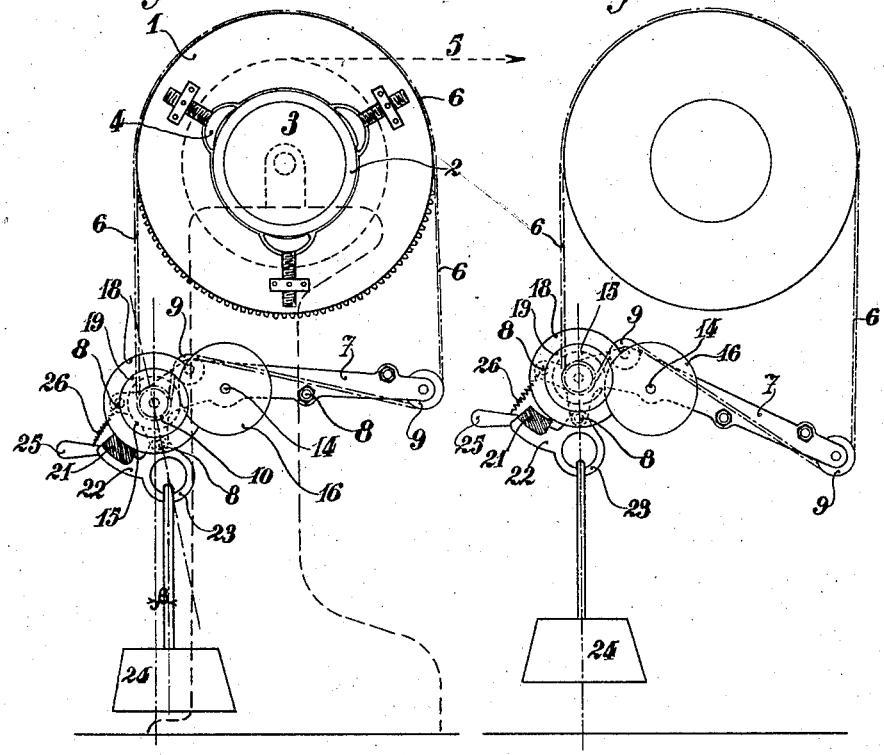
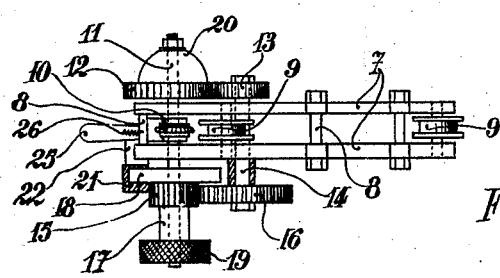
Inventor:
Henri François Gillot
by
Attorney Patented Jan. 4, 1927.

1,613,320

UNITED STATES PATENT OFFICE.

HENRI FRANÇOIS GILLOT, OF LYON, FRANCE.

WEAVING LOOM.

Application filed January 9, 1926, Serial No. 80,272, and in France January 27, 1925.

In weaving looms, the warp must be unrolled from a roller or beam under a constant and regular tension. The devices used at the present time for insuring this tension are either very intricate or much too imperfect. Rope brakes are irregular in operation and this results in defects in the cloth, which are a most serious drawback when dealing with silk or with light tissues.

The present invention has for its object a device which may be applied on any kind of weaving loom beam and which insures a strictly constant tension of the warp, while permitting the latter to be unrolled at each throw of the shuttle, under the action of the roller on which the finished stuff is wound. This device comprises in combination:

1. A mechanism comprising a speed multiplying gearing and a brake which is controlled by weights, said weights insuring at the same time the tension of the warp.

2. A sprocket wheel which is fixed to one end of the beam, and an endless chain which is passed on said wheel and on a pinion of said mechanism, the latter being thus supported by the chain.

The annexed drawings show, by way of example, a tension device according to the invention.

Fig. 1 is a side view of the device in the position in which the brake is applied.

Fig. 2 represents the device in the position in which the brake is released.

Fig. 3 is a plan view of the brake mechanism.

A sprocket wheel 1 is locked on one of the usual collars 2 of the beam 3 on which the warp has been wound up, by means of three jaws 4 which are pressed on collar 2 by screws. The warp 5 is shown in dotted lines in Fig. 1.

An endless chain 6 is passed over wheel 1, the brake mechanism being supported by this chain under the beam.

The frame of said mechanism is made of two parallel plates 7 which are assembled by stays 8. Between plates 7 are housed two idlers 9 and a chain pinion 10 of small diameter, which is keyed on a shaft 11. A gear wheel 12 is also keyed on shaft 11 outside the plates. This gear wheel 12 meshes with a pinion 13 keyed on a secondary shaft 14. A gear wheel 16 is keyed on the other end of shaft 14 and meshes with a pinion 15 which is supported by a hollow shaft 17 rotating freely on shaft 11, as may be understood from Fig. 3.

When pinion 10 rotates at a slow speed, pinion 15 and shaft 17 are rotated at high speed through the multiplying gearing described.

Shaft 17 is also provided with a wheel 18 having a smooth periphery, and with a hand wheel 19. Shaft 11 is provided with a weight 20 for balancing the whole device in such a way that shafts 11, 14 and 17 remain horizontal.

The rubbing piece or shoe 21 of the brake is made of leather, fiber or the like; it is fixed to a lever 22. This lever is pivoted on one of the stays 8 and is provided with a hole 23 for hanging the weight 24 which insures the tension of the warp. Lever 22 is also provided with a handle 25 which is acted upon by a retractile spring 26.

As may be seen in Figs. 1 and 2, the endless chain 6 is passed around idlers 9 and pinion 10 between plates 7.

When the device is in the position illustrated in Fig. 1, the brake shoe 21 is applied on the rim of wheel 18 by the action of spring 26 and by the torque which the weight 24 exerts on lever 22, said torque being proportional to the length $\beta$ shown in Fig. 1. The pressure of shoe 21 on the rim of wheel 18 is great enough to prevent any rotation of the latter.

When the roller on which the finished stuff is wound moves, the warp is unrolled from the beam 3 which rotates clockwise a small amount, thereby varying the angular position of frame 7, the left-hand end of which is raised slightly, while its right-hand is lowered, so that the device is thus brought to the position of Fig. 2. As spring 26 is a very weak one, the brake shoe 21 is released under the action of weight 24; wheel 18 then rotates freely and the device reassumes the angular position of Fig. 1 in which the shoe 21 is pressed against the rim of wheel 18 by the action of weight 24, thus stopping any further rotation. This return movement of the device from Fig. 2 to Fig. 1 position is due to the fact that the frame constituted by the parts 7, 8 etc., and from which the weight 24 is loosely suspended, is a rigid unit and is movable as such; so that as soon as the brake shoe 21 is released and the chain 6 can travel freely, the lifting action of said chain upon the left end of the frame ceases and the weight 24 then will pull that end of the frame slightly downward, thereby bringing the rim of wheel 18 into engagement with the brake shoe.

From the foregoing, it will be understood that the braking pressure depends upon the angular position of frame 7 which changes when the beam rotates, such position varying between two limits, in one of which (Fig. 1) the braking pressure is great enough to prevent rotation, while in the other position (Fig. 2) the brake is not applied at all, the wheel 18 being entirely free to rotate.

When the warp is to be slackened, the operator releases shoe 21 by means of handle 25, wheel 18 then rotates freely regardless of the position of frame 7, and weight 24 descends to the ground. Hand wheel 19 is then used to rotate the gearing and thereby tension the warp again without having to lift directly the heavy weight 24.

The device insures a regular tension for any kind of work without any adjustment. The finished stuff is thus free from any defect.

When necessary, each end of the beam may be provided with a device according to the invention.

The described drawings are given merely as an example and the details may be varied in each case. When dealing, for instance, with beams provided with a square shaft, it will be found convenient to use a sprocket wheel provided with a square hole in its center, and to get rid of any adjustable jaw of the kind represented in Fig. 1. In lieu of sprocket wheel 1, any other kind of chain wheel could be used.

What I claim as my invention and desire to secure by Letters Patent of the United States is:

1. A let-off device for looms, comprising a chain wheel, an endless chain passing around said wheel and depending below the same, a freely-floating frame suspended from and supported wholly by said chain and caused to assume different angular positions consequent upon the rotary movements of the chain wheel, gearing mounted in said frame to be actuated by the chain, a wheel rigidly connected to said gearing for rotation in unison therewith, a brake operative upon the last-named wheel, and a weight suspended from said brake to control its action in accordance with the angular movements of the frame.

2. A let-off device for looms, comprising a chain wheel, an endless chain passing around said wheel and depending below the same, a freely-floating frame suspended from and supported wholly by said chain and caused to assume different angular positions consequent upon the rotary movements of the chain wheel, a speed-multiplying gearing mounted in said frame to be actuated by the chain, a brake lever pivoted to the frame, a shoe carried thereby, a wheel fixed to the high-speed shaft of said gearing for engagement by the brake shoe, and a weight suspended from the brake lever to control the action thereof consequent upon the angular movements of the frame.

3. A let-off device, according to claim 1, in which a pair of idlers are mounted at opposite ends of the floating frame and around which the depending chain passes so as to support the frame; and in which a chain pinion, driven by said chain, is mounted in the central portion of the frame and is connected to drive the gearing.

4. A let-off device, according to claim 2, in which the speed-multiplying gearing embodies parallel main and secondary shafts, a wheel on the main shaft for driving engagement by the chain, multiplying gears connecting the main and secondary shafts, a hollow high-speed shaft loosely fitted on said main shaft, and multiplying gears connecting the secondary and hollow shafts.

5. A let-off device, according to claim 1, embodying means for releasing the brake by hand, and means for rotating the gearing by hand to move the chain wheel and chain in a direction to effect re-tensioning of the warp after its tension has been slackened.

In testimony whereof I affix my signature.

HENRI FRANÇOIS GILLOT.